United States Patent [19]
Song

[11] Patent Number: 5,852,654
[45] Date of Patent: Dec. 22, 1998

[54] COUPLING DEVICE FOR USE WITH A COMPUTER SYSTEM

[75] Inventor: Moon-Jong Song, Suwon, Rep. of Korea

[73] Assignee: SamSung Electronics Co., Ltd., Kyungki-do, Rep. of Korea

[21] Appl. No.: 603,854

[22] Filed: Feb. 22, 1996

[30] Foreign Application Priority Data

Feb. 22, 1995 [KR] Rep. of Korea ............... 1995 3439
Feb. 22, 1995 [KR] Rep. of Korea ............... 1995 2892

[51] Int. Cl.⁶ .................................................. H04M 11/00
[52] U.S. Cl. ........................... 379/93.05; 379/110.01; 379/420
[58] Field of Search ................. 364/705.05, 710.12, 364/927.83, 929, 237.2–237.5, 237.9; 381/24, 87, 88, 90, 91, 80, 81, 306, 332, 334; 379/419, 420, 428, 442, 124, 110, 93.05, 110.01; D14/100, 102, 107, 113, 114, 144

[56] References Cited

U.S. PATENT DOCUMENTS 4,560,838  12/1985  Meisnheimer ........................... 379/110
5,283,638   2/1994  Engberg et al. ....................... 379/90.01
5,481,616   1/1996  Freedman ................................. 381/90
5,483,577   1/1996  Gulick ...................................... 379/88
5,633,943   5/1997  Daniels et al. ........................... 381/90

Primary Examiner—Stella Woo
Attorney, Agent, or Firm—Robert E. Bushnell, Esq.

[57] ABSTRACT

A coupling device capable of telephone function for use with a computer system is disclosed. The coupling device incorporates internally equipped speakers so as to save space and a telephone speech network for enabling a user working on a computer system to utilize a telephone function. Accordingly, when the user is wanted on the phone, there is no need to stop working nor to surrender to any inconvenience in terms of holding a telephone set on the shoulder so as to continue work. A variety of functions embodied by the combination of a computer sound generator, a switching circuit and a telephone control circuit enhances the usage of a computer system.

22 Claims, 9 Drawing Sheets

COUPLING DEVICE FOR USE WITH A COMPUTER SYSTEM

CROSS-REFERENCE TO RELATED APPLICATIONS

This application makes reference to, incorporates the same herein, and claims all benefits accruing under 35 U.S.C. § 119 from a patent application entitled COMPUTER SYSTEM CONNECTOR HAVING TELEPHONE FUNCTION and a utility model application entitled MONITOR STAND, both earlier filed in the Korean Industrial Property Office, on the 22nd day of Feb. 1995 and there respectively assigned Ser. No. 3439/1995 and Ser. No. 2892/1995.

BACKGROUND OF THE INVENTION

The present invention generally relates to a coupling device for use with a computer system, and, more particularly, to a connecting circuit and device for a computer system having a telephone function.

Contemporary designs of personal computers provide a variety of multi-media functions, such as, graphical displays, moving picture displays, television, MIDI and audio players by using compact disk read only memory (i.e., CD-ROM) drives. To provide a multi-media environment, most computers are equipped with a slot to internally mount a predetermined card, and speakers are externally provided to produce audible sounds. I have noticed that on occasion, a user receives an incoming telephone call and wants to talk to the caller on the telephone while continuing to use the multi-media computer system, or alternatively, without interrupting the performance of the multimedia computer system. I have also observed that in these situations, while using contemporary computer systems the user has no choice but to either stop work, or continue to work with a telephone receiver placed against his ear. In addition, I have found that externally mounted speakers occupy additional space, which is frequently inconvenient.

SUMMARY OF THE INVENTION

Accordingly, it is an object of the present invention to provide an improved coupling for a computer system.

It is another object to provide a coupling device capable of providing a telephone function for a computer system.

It is still another object to provide a coupling device for use with a computer system in which a loudspeaker is internally installed so as to reduce the amount of space occupied by the computer system.

It is yet another object to provide a coupling device which is capable of providing a telephone function so that a computer user may freely use the telephone while working on the computer.

These and other objects may be achieved according to the principles of the present invention with a coupling device having a mounting portion which is arranged to be lockingly engaged to and detachable from a lower portion of a video display monitor; an internally installed loudspeaker for generating audible sounds; a control panel for selectively controlling telephone and audio functions; a plurality of input-output terminals for providing input and output of signals via either a telephone cable or terminals of a computer sound generator; and a sound control circuit for coupling a signal output from the computer sound generator and a telephone signal input via the input-output terminals for output to the loudspeaker.

The sound control circuit may be constructed with a telephone control circuit for controlling input-output signals via telephone cable lines; an amplifier circuit for amplifying signals output from telephone control circuit and computer sound generator and controlling volume to provide an output signal; a speaker controller for selectively outputting a signal output from either the amplifier circuit or the telephone control circuit; a switching controller connected to the telephone control circuit, the computer sound generator and the amplifier circuit, for selectively switching a signal output from either the telephone control circuit or the computer sound generator to the amplifier circuit; and signal input means for applying a signal input from the telephone control circuit, the computer sound generator and an external microphone to the switching controller.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
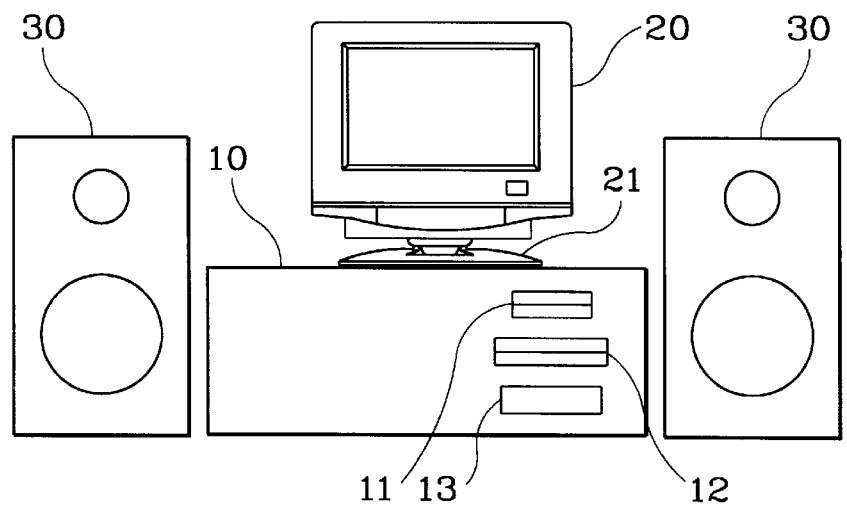
FIGS. 1A and 1B are front views of a conventional multimedia computer system respectively illustrating different arrangements thereof.
Figure 1B:
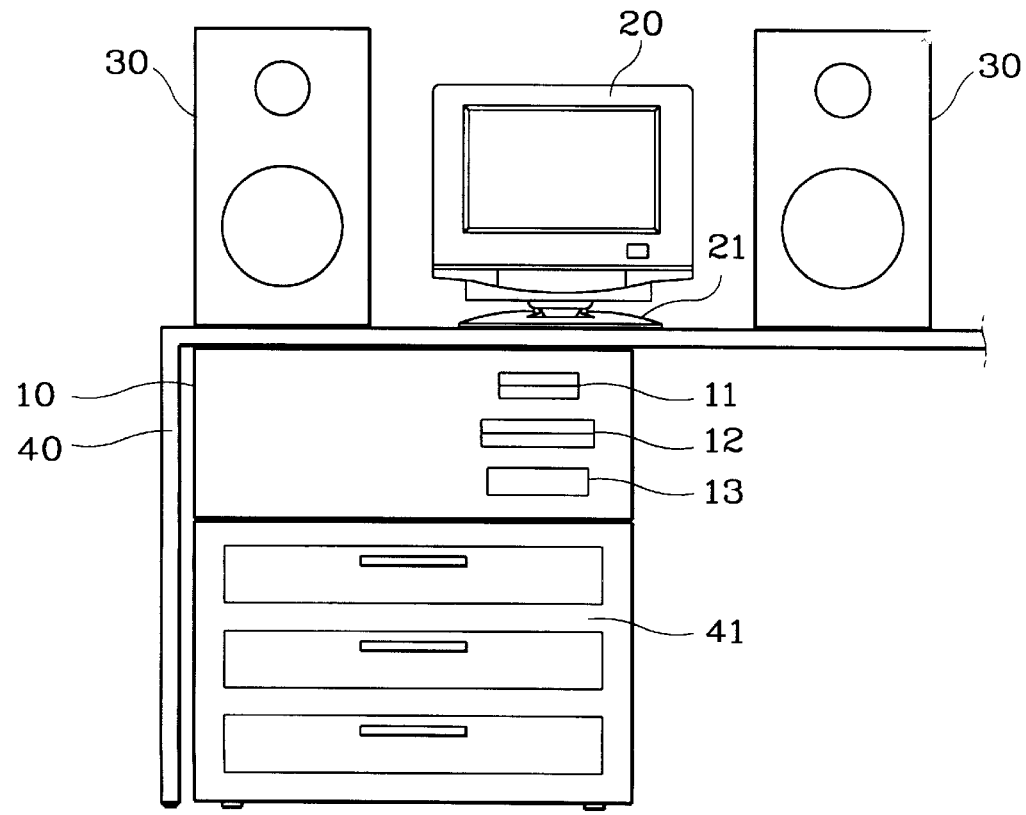

Turning now to the drawings, FIGS. 1A and 1B are abstract representations of conventional multi-media computer systems. As shown in FIG. 1A, a main body 10 of the computer incorporates a set of floppy disk drives (FDDs) 11, 12 and a CD-ROM drive 13. A monitor 20 is placed on main body 10 via an intermediary coupling device 21. Typically, a set of stereophonic speakers 30 are arranged on both sides of main body 10.

To reduce the amount of space occupied by the computer system shown in FIG. 1A, a configuration such as the one shown in FIG. 1B has been proposed. In FIG. 1B, main body 10 is placed on the top of a drawer 41 while monitor 20 and speakers 30 are placed on the top of a table 40. In the configuration shown in FIG. 1B, however, speakers 30 still occupy an unnecessary amount of space.

Figure 2A:
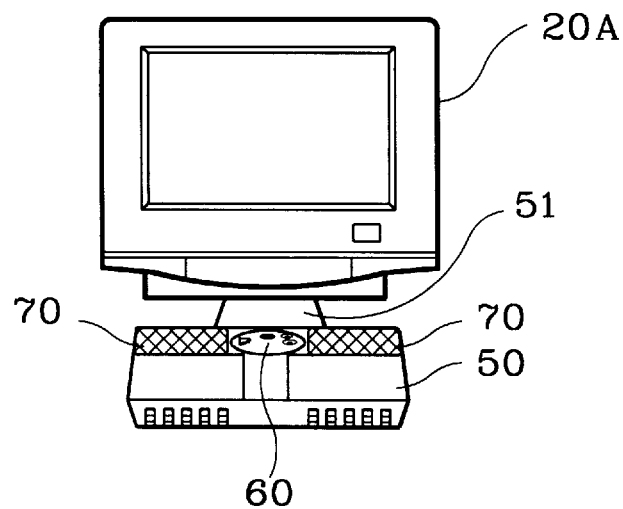
FIGS. 2A and 2B are respectively front and back views of one preferred embodiment of a coupling device constructed according to the principles of the present invention, when assembled with a video display monitor.
Figure 2B:
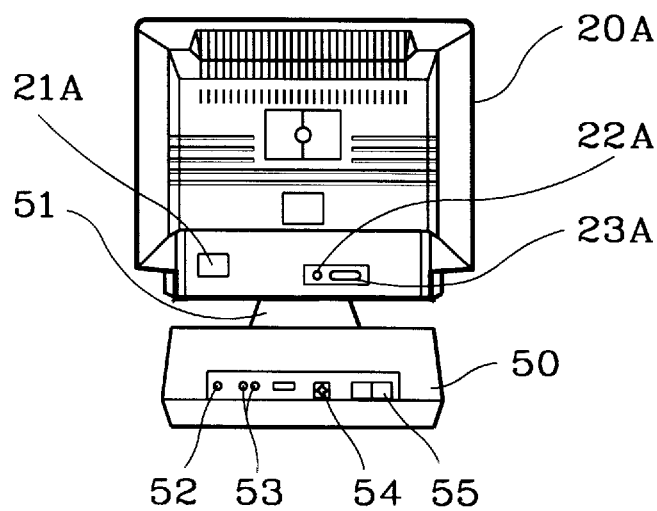

Referring now to FIGS. 2A and 2B, schematic front and back views of a preferred embodiment of a coupling device constructed according to the principles of the present invention when assembled with a video display monitor are illustrated.

As shown in FIG. 2A, a mounting portion 51 is generally positioned at a center area of a top surface of a coupling device 50 and is lockingly attachable to and detachable from a video display monitor 20A. A control console 60 is located at a center area of an upper portion of a front panel of coupling device 50, and a set of left and right loudspeakers 70 are installed on both sides of control console 60.

On a back panel of coupling device 50, as shown in FIG. 2B, a microphone input terminal 52, a set of left and right voice input terminals 53, a DC voltage input terminal 54 and telephone cord connect terminals 55 are provided. On a lower portion of a back panel of a video display monitor 20A, a known power supply input terminal 21A, a video signal input terminal 23A for receiving a video display signal output from a computer, and a power supply terminal 22A for supplying power to coupling device 50 are provided. Accordingly, power supply terminal 22A provided on the back panel of video display monitor 20A is electrically connected to DC voltage input terminal 54 at coupling device 50 via a cable cord so as to form an electrical conduction path for supplying an operating power supply to the various internal circuits of coupling device 50.

Figure 3A:
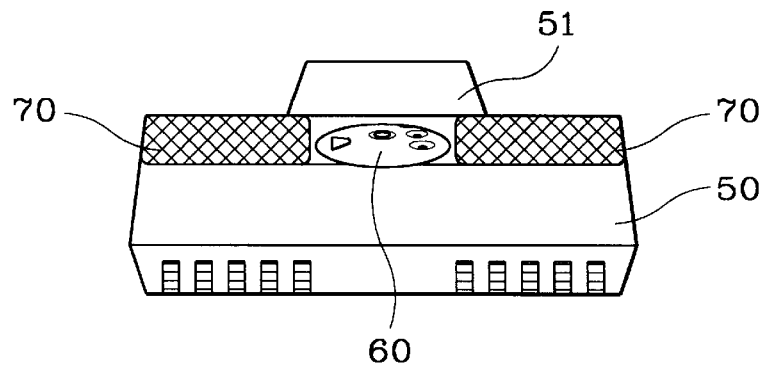
FIGS. 3A, 3B and 3C are respectively front, partial plan, and left side views of one preferred embodiment of a coupling device constructed according to the principles of the present invention.
Figure 3B:
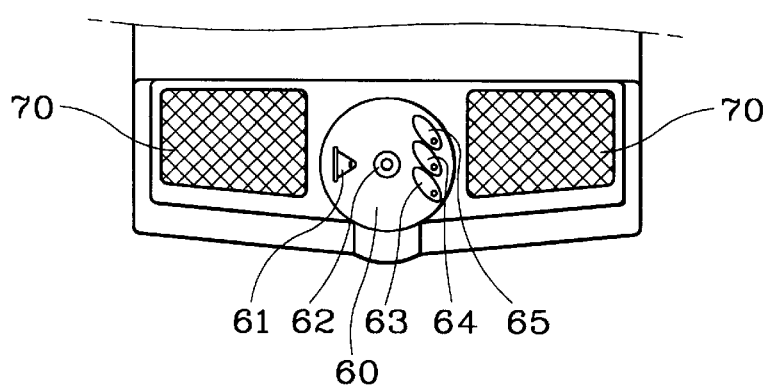
Figure 3C:
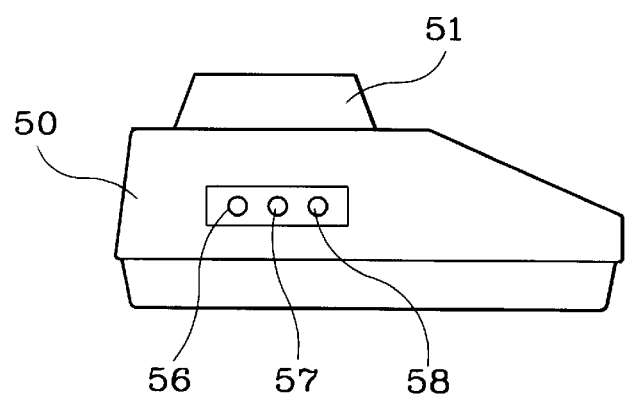

Moving on to FIGS. 3A, 3B and 3C, respective schematic diagrams illustrate a detailed outward appearance of various views of coupling device 50. An upper, front portion of coupling device 50 preferably slopes at a slight grade. Left and right loudspeakers 70 are internally provided on both sides of the sloped area. Control console 60 is positioned between loudspeakers 70. A volume control switch 61, a microphone for telephony 62, a telephony microphone selection switch 63, a hook switch and display 64 and an audio switch and display 65 are provided on control console 60. A telephone voice switch 56, a headphone terminal 57 and an external microphone input terminal 58 are respectively provided on a side wall of coupling device 50.

Figure 4:
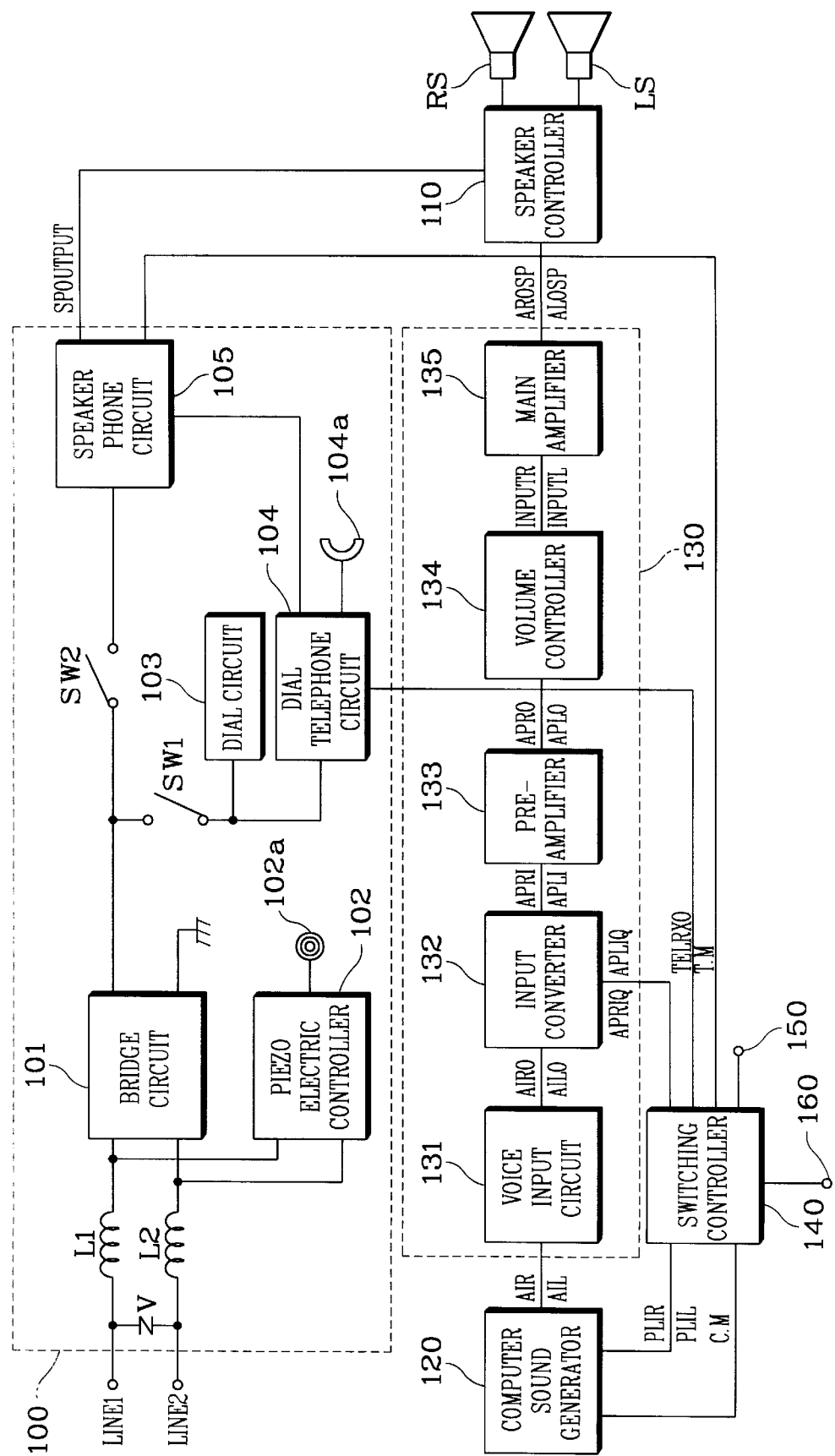
FIG. 4 is a schematic block diagram illustrating a preferred embodiment of a sound control circuit constructed according to the principles of the present invention.

In addition, coupling device 50 constructed as described above incorporates a sound control circuit having a schematic block diagram shown in FIG. 4. The sound control circuit of FIG. 4 includes: a pair of telephone cable line input terminals LINE 1 and LINE 2 connected to a telephone control circuit 100; an amplifier circuit 130 for amplifying an audio signal output from a computer sound generator 120 and controlling an output volume; a speaker controller 110 for selecting a signal output from either amplifier circuit 130 or telephone control circuit 100 for transmission to left and right loudspeakers 70; a switching controller 140 connected to telephone control circuit 100, computer sound generator 120 and amplifier circuit 130, for transmitting a signal input via a signal input means 150 to either telephone control circuit 100 or computer sound generator 120, or serving as a connector for applying a signal output from telephone control circuit 100 to computer sound generator 120; and a display means 160 for visually displaying a signal output from switching controller 140 using a predetermined lamp, such as, a light emitting diode LED.

In a preferred configuration of telephone control circuit 100 described above, the pair of telephone cable line input terminals LINE 1 and LINE 2 are both connected to a bridge circuit 101 via a pair of coils L1 and L2 and a varistor V, and are also connected to piezo electric controller 102 which drives a piezo electric loudspeaker 102a. An output of bridge circuit 101 is commonly applied to a dial circuit 103 and a dial telephone circuit 104 commonly via a hook switch SW1, and is applied to speaker phone circuit 105 via a switch SW2. Dial telephone circuit 104 is connected to a telephone set 104a.

Amplifier circuit 130 comprises: a voice input circuit 131 for receiving a voice signal output AIR, AIL from computer sound generator 120; an input converter 132; a pre-amplifier 133 for amplifying an audio signal received from input converter 132 and controlling the volume of an amplifier signal for output at its output terminal; a volume controller 134; and a main amplifier 135.

Signal input means 150 incorporates, but is not limited to, various input devices provided in coupling device 50. Similarly, display means 160 also includes every and all output device formed and provided in coupling device 50. The input devices refer to a plurality of switches, a microphone and terminals or whatever is provided on a sidewall of coupling device 50 and control console 60. The output devices mentioned above refer, in a similar manner, to a variety of displays and terminals provided on control console 60 and a sidewall of coupling device 50.

Now, the operation of coupling device 50 having a configuration as described above will be explained in detail.

Mounting portion 51 of a preferred embodiment of coupling device 50 constructed according to the principles of the present invention is arranged to be lockingly engaged with the lower portion of a video display monitor 20A, and power supply terminal 22A provided at rear side of video display monitor 20A is connected to DC input terminal 54 provided on coupling device 50 by using a cable so as to form an electrical conduction path, thereby supplying operating power. A pair of telephone cord lines L1 and L2 and a cord cable for providing external telephone sets are connected to power cord connector terminals 55. After providing these connections, operation can be commenced.

As a result, an operational progress is made via a variety of functions associated with switches and terminals provided on control console 60 of coupling device 50. Thus, an output signal from either computer sound generator 120 or telephone control circuit 100 may be utilized to provide audible sound via loudspeaker 70, while telephony microphone 62 eliminates the need for usage of a telephone set during use of the computer system in use.

Now, a detailed description of an operation of the circuits employed to accomplish the functions explained above will hereinafter be given.

Once a predetermined signal of a certain voltage level from an external telephone network is applied to telephone control circuit 100 via the pair of telephone cable line input terminals LINE 1 and LINE 2 when the computer is in use, an input signal is collectively applied to bridge circuit 101 and piezo electric controller 102 through a network comprising a varistor V and the pair of coils L1 and L2. Consequently, the signal applied to piezoelectric controller 102 drives piezoelectric loudspeaker 102a to actuate a tone ringer, thereby generating an audible sound.

The signal applied to bridge circuit 101 is rectified and smoothed so that a telephone speech network incorporating dial circuit 103 and dial telephone circuit 104 is thereby energized. Once dial telephone circuit 104 is powered on, then a DC network is formed between telephone set 104a and an external telephone switching board, thereby enabling bidirectional transmission of an electrical signal representing an audible sound. As a result, input signals comprised of a train of input signals, representing a telephone number generated by a corresponding number of key strokes, are transmitted via dial circuit 103 to telephone set 104a of the recipient causing a tone ringer of telephone set 104a to actuate.

A hook switch SW1 is toggled by telephone hand set 104a. In an on-hook state, hook switch SW1 is open. On the contrary, in an off-hook state, hook switch SW1 is closed to enable electrical conduction.

Another switch SW2 is provided for operation of speaker phone circuit 105. When switch SW2 is closed, speaker phone circuit 105 is energized to operate. Once an audio signal representing a voice message of a user is input to switching controller 140 via signal input means 150, the voice signal input is transmitted to speaker phone circuit 105, being conveyed in turn to telephone set 104a of a recipient via line terminals LINE 1 and LINE 2, and vice versa, the voice message of the recipient is transmitted to speaker phone circuit 105 in reverse manner, and is then applied to a pair of loudspeakers RS, LS via speaker controller 110 to generate an audible sound. Accordingly, even though the computer system is in use, telephone set 104a or a speaker phone function may be selectively chosen by a user for the purpose of telephone communication by only switching and toggling both microphone selection switch 63 and hook switch 64 provided on control console 60.

In addition, signal input stage 150, switch SW2 and the pair of loudspeakers RS and LS may well be positioned at any location of the computer system, and more dynamically, an instruction for operating switch SW2 may also be given by way of a key stroke.

Meanwhile, left and right voice signals AIL and AIR output from computer sound generator 120 are input to input converter 132 via voice input circuit 131. Input converter 132 determines whether to select a pair of output signals AIRO, AILO of voice input circuit 131 or those of switching controller 140 APRIQ, APLIQ, so as to then output determined signals APRI, APLI to pre-amplifier 133 for slight signal amplification and thereby, avoid sound loss. Output signals of pre-amplifier 133 APRO, APLO are applied to volume controller 134 so as to control sound volume.

Output signals INPUTR, INPUTL provided from an output terminal of volume controller 134 are fed to main amplifier 135 so as to be amplified. Left and right voice signals AROSP, ALOSP are then output to speaker controller 110. Consequently, signals AROSP, ALOSP applied from main amplifier 135 to speaker controller 110 are converted into an audible sound via left and right loudspeakers LIP, RP.

Now, various embodiments of the circuits associated with the sound control circuit shown in FIG. 4 constructed according to the principle of the present invention will be described in greater detail.

Figure 5:
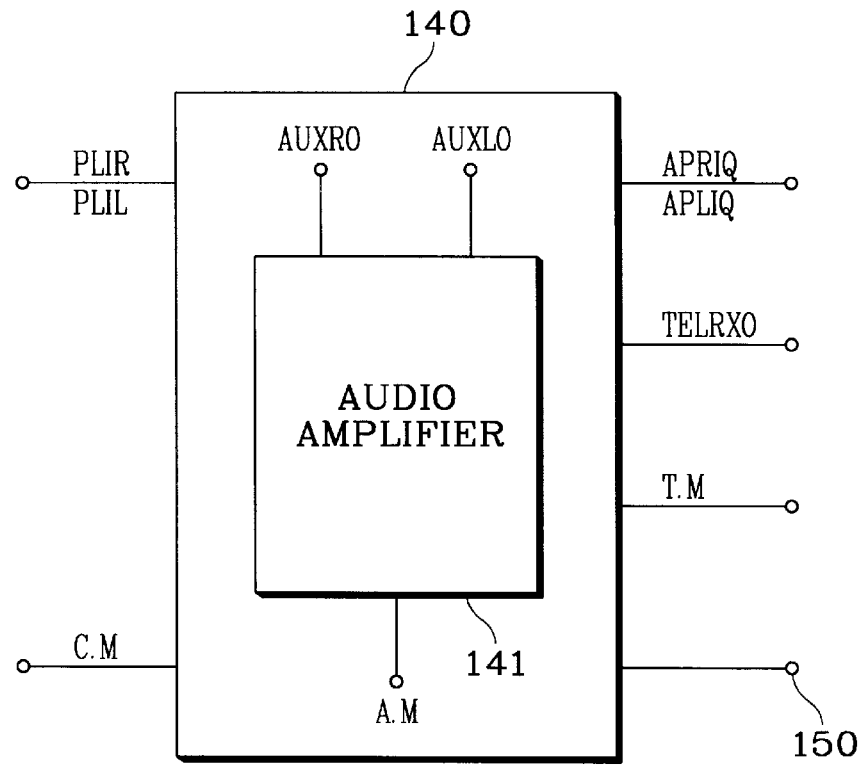
FIG. 5 is a circuit block diagram of the switching controller of FIG. 4.

A schematic block diagram of one embodiment of switching controller 140 is illustrated in FIG. 5. Switching controller 140 incorporates audio amplifier 141 which receives a voice signal at its input terminal A.M, and separates and amplifies a left voice signal AUXLO and a right voice signal AUXRO for output at its output terminals.

Figure 6:
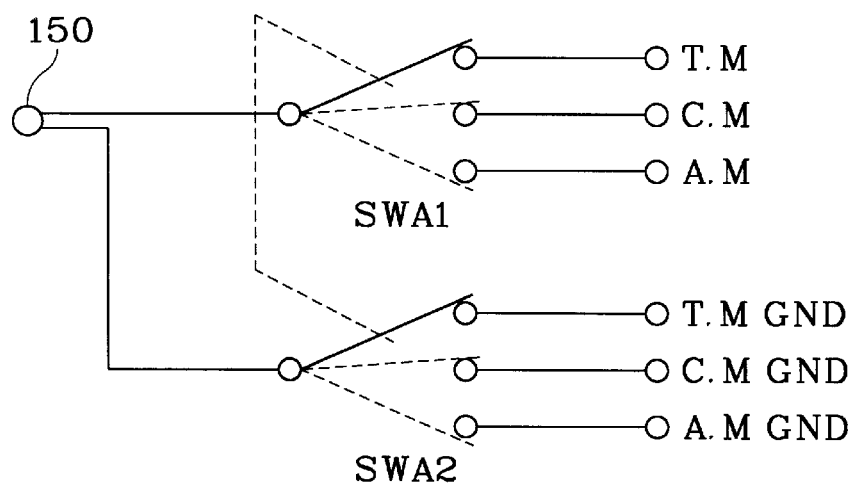
FIG. 6 is an embodiment of the switching controller of FIG. 4.

Another embodiment of switching controller 140 is illustrated in FIG. 6. wherein a terminal of signal input means 150 is connected to a moving arm terminal of a switching means SWA1. The fixed terminals of switching means SWA1 are respectively connected to terminals of input signal T.M provided from speaker phone circuit 105, input signal C.M provided from computer sound generator 120 or input signal A.M provided from audio amplifier 141, for selectively switching the signals.

Another terminal of signal input means 150 is connected to a moving arm terminal of a switching means SWA2, while fixed terminals thereof are respectively connected to corresponding ground terminals T.M GND, C.M GND and AM GND. The pair of switching means SWA1 and SWA2 are ganged switches. As a result, a voice signal input via signal input means 150 is able to be transmitted to any input terminal of speaker phone circuit 105, computer sound generator 120, or audio amplifier 141 incorporated in switching controller 140.

Figure 7:
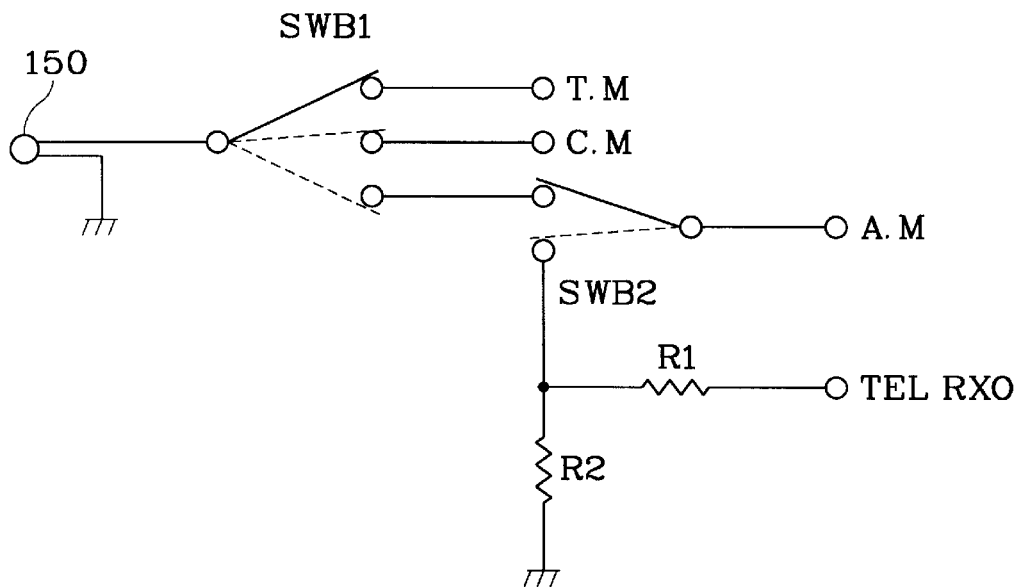
FIG. 7 is another embodiment of the switching controller of FIG. 4.

FIG. 7 illustrates another exemplary embodiment of switching controller 140. In the embodiment shown in FIG. 7, a terminal of signal input stage 150 is connected to a moving arm terminal of a switching means SWB1, while fixed terminals thereof are connected with input terminal TM of speaker phone circuit 105 and input terminal C.M of computer sound generator 120.

Another fixed terminal is connected to a fixed terminal of a switching stage SWB2. A moving arm terminal of switching stage SWB2 is connected to input terminal A.M of audio amplifier 141, while the other fixed arm thereof is coupled to a reference potential such as a local ground, via a resistor R2, and is also connected to an output terminal TELRXO of dial telephone circuit 104 via a voltage dividing resistor R1.

As a result, an input signal of signal input stage 150 is able to be transmitted to any one input terminal of speaker phone circuit 105, computer sound generator 120 or audio amplifier 141 (A.M) by selectively switching the above described switching stage SWB1. In a similar manner, by selectively switching stage SWB2, a voice signal input at line input terminals LINE1 and LINE2 is able to be transmitted to audio amplifier 141 via dial telephone circuit 104.

Figure 8:
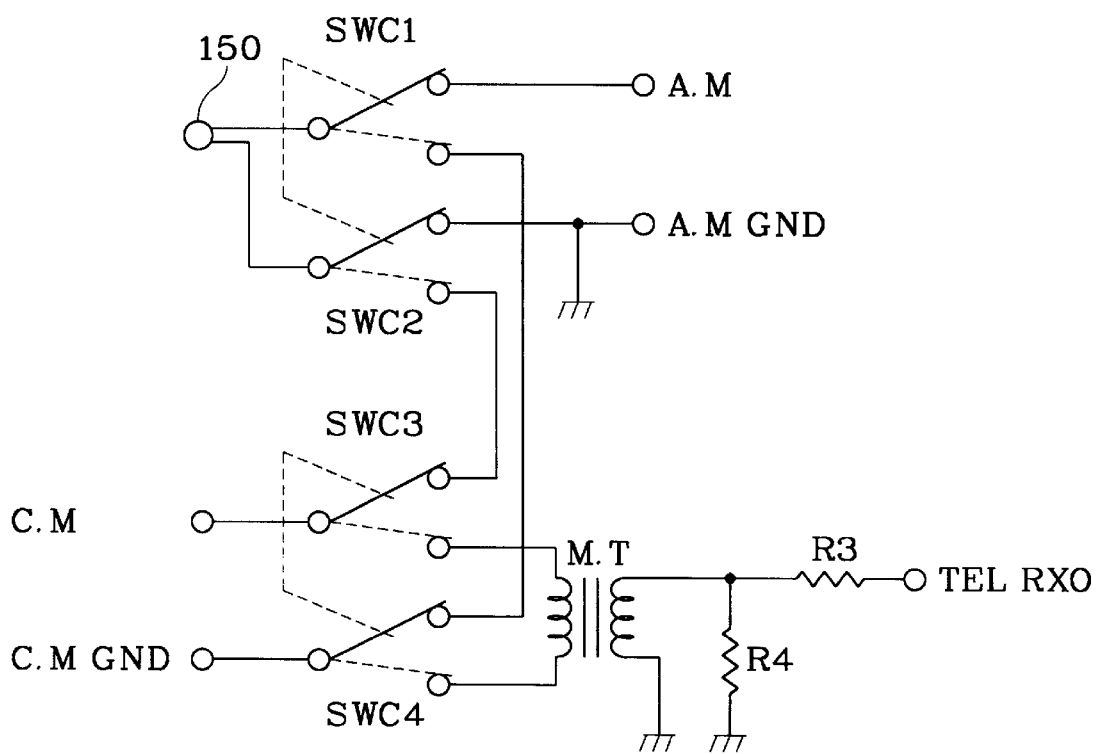
FIG. 8 is still another embodiment of the switching controller of FIG. 4.

The schematic diagram shown in FIG. 8 illustrates still another exemplary embodiment of switching controller 140, wherein a terminal of signal input stage 150 is connected to a moving arm terminal of a switching stage SWC1, a fixed terminal thereof being connected to input terminal A.M of audio amplifier 141, another fixed terminal being connected to a fixed terminal of switching stage 150 is connected to a moving arm terminal of switching stage SWC2, a fixed terminal being connected to a ground terminal A.M GND of audio amplifier 141, another fixed terminal being connected to a fixed terminal of switching stage SWC3. In turn, a moving arm terminal of switching stage SWC3 is connected to a terminal of input signal C.M of computer sound generator 120, while a fixed terminal thereof is connected to a fixed terminal of switching stage SWC4 via secondary turns of a matching transformer M.T. To a moving arm of switching stage SWC4 is connected a ground terminal C.M GND of computer sound generator 120. An input signal TELRXO applied from telephone circuit 104 is connected via attenuation resistors R3 and R4 to an input terminal of a primary winding of matching transformer M.T. A terminal of resistor R4 is connected to a junction node of a terminal of resistor R3 and an input terminal of the primary winding, while the other terminal is grounded. The output terminal of the primary winding is also grounded. Both pairs of switching stages, a combination of switching stages SWC1 and SWC2 and SWC3 and SWC4, are collectively ganged switches.

Accordingly, by an operation of the ganged switches, switching stages SWC1 and SWC2, a signal input from signal input stage 150 is able to be selectively transmitted to an input terminal of audio amplifier 141 or an input terminal of computer sound generator 120. In a similar manner, by using a selective switching operation of a pair of switching stages SWC3 and SWC4, an output signal from dial telephone circuit 104 is attenuated by resistors R3 and R4 and is then transmitted to an input terminal of computer sound generator 120 across matching transformer M.T.

The above arrangement is provided for a computer system to read a status of transmitting or receiving a voice signal at telephone speech network by using an electric conduction line of signal input stage 150. Namely a voice signal is able to be input to either a computer system or an audio amplifier by using the electrical conduction path of signal input stage 150, and therefore a signal input from signal input stage 150 and a telephone signal may be transmitted to the computer system.

Figure 9:
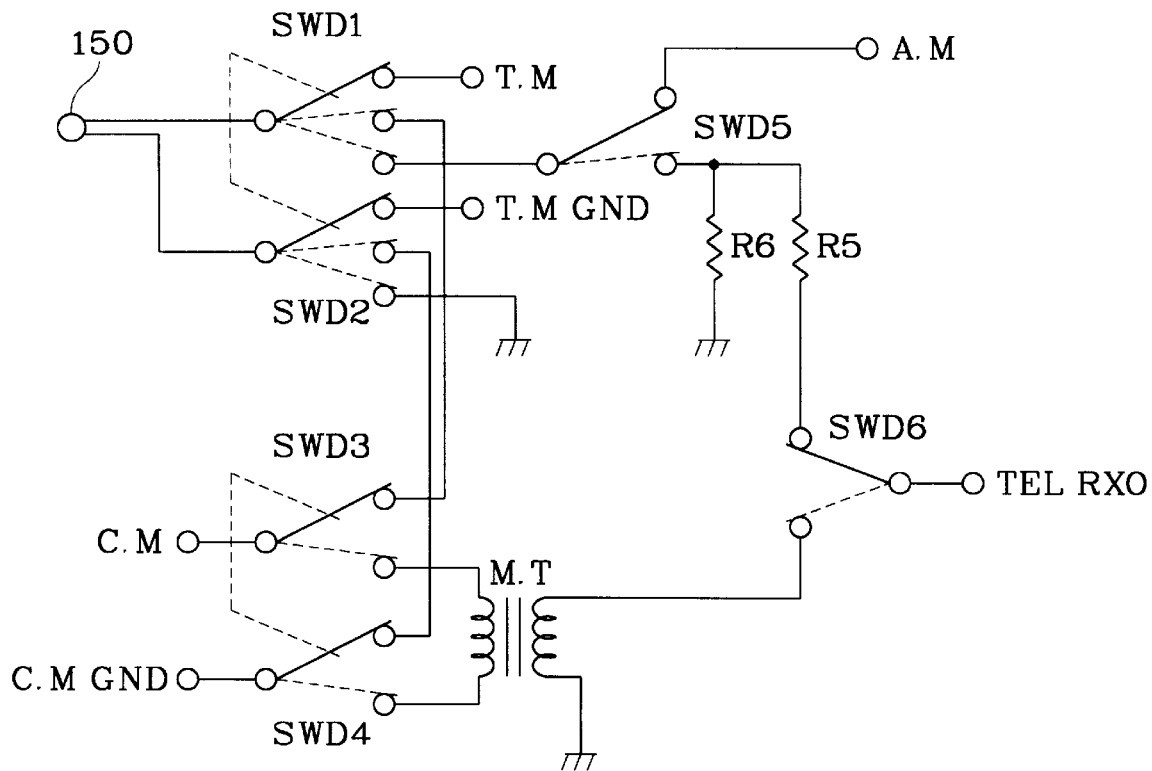
FIG. 9 is yet another embodiment of the switching controller of FIG. 4.

Yet another exemplary embodiment of switching controller 140 is illustrated in FIG. 9, wherein a terminal of signal input stage 150 is connected to a moving arm terminal of a first switching stage SWD1, a fixed terminal of the stage SWD1 being in turn connected to an input terminal T.M of speaker phone circuit 105. Another terminal of signal input stage 150 is connected to the moving arm of a second switching stage SWD2, and a fixed terminal of the second switching stage SWD2 is connected to a ground terminal T.M GND of speaker phone circuit 105. Another terminal thereof is connected to a fixed terminal of a fourth switching stage SWD4, another fixed terminal of first switching stage SWD1 being connected to the moving arm of a fifth switching stage SWD5, and a fixed terminal thereof being connected to an input terminal A.M of audio amplifier 141. Another fixed terminal of fifth switching stage SWD5 is connected via a pair of resistors R5 and R6 to a sixth switching stage SWD6, and signal output TELRXO of dial telephone circuit 104 is connected to the moving arm terminal of sixth switching stage SWD6. Another fixed terminal thereof is connected to the input terminal of a primary winding of a matching transformer M.T, another fixed terminal of second switching stage SWD2 is connected to ground potential terminal, and respective moving arms of third and fourth switching stages SWD3 and SWD4 are connected to an input terminal C.M and ground terminal C.M GND of computer sound generator 120. Another fixed terminal of third switching stage SWD3 is connected to the input terminal of secondary turns of matching transformer M.T, and another fixed terminal of fourth switching stage SWD4 being is connected to the output terminal of secondary turns of the transformer M.T. A pair of switching stage, first and second stage SWD1 and SWD2, are ganged switches. Also third and fourth switching stages SWD3 and SWD4 are ganged switches.

As a result, by switching stage SWD1, it is determined to which input terminal a voice signal input via signal input stage 150 is to be transmitted, whether an input terminal of speaker phone circuit 105, of computer sound generator 120 or of audio amplifier 141. By a switching operation of switching stage SWD5, it is selected as to which input terminal a signal input from signal input stage 150 is transmitted, either an input terminal TELRXO of telephone circuit 104 or an input terminal AM of audio amplifier 141. A signal output TELRXO of telephone circuit 104 is selected by a switching operation of a pair of switching stages SWD3, SWD4, as to whether the signal is transmitted to computer sound generator 120 across matching transformer M.T, an input or output of telephone circuit 104 is selectively coupled to either computer sound generator 120 or signal input stage 150 by a selection operation of switching stage SWD6.

Figure 10:
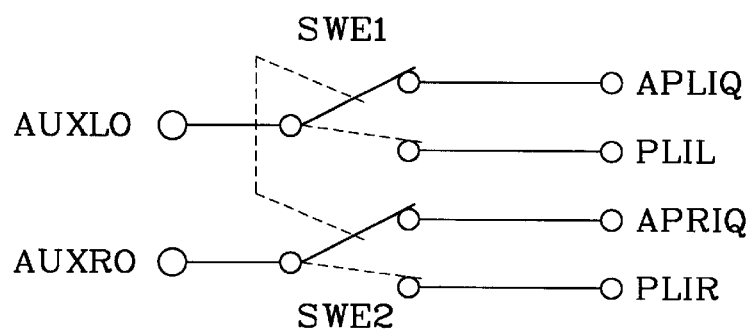
FIG. 10 is still yet another embodiment of the switching controller of FIG. 4.

Still another embodiment of switching circuit 140 is illustrated in FIG. 10, wherein left voice signal AUXLO, which is an output signal of audio amplifier 141, is connected to the moving arm of first switching means SWE1. A fixed terminal of first switching means SWE1 is connected to a left voice signal APLIQ terminal, while another terminal is connected to left voice signal PLIL input terminal of computer sound generator. A right voice signal AUXRO, which is also an output signal of audio amplifier 141, is connected to the moving arm terminal of second switching means SWE2, and a fixed terminal thereof is connected to right voice signal APRIQ, while another terminal is connected to right voice signal input PLIR terminal of computer sound generator. Here, a pair of switching stages SWE1, SWE2 are ganged switches.

Accordingly, it is determined by a switching operation of switching stages SWE1 and SWE2 whether a signal output of audio amplifier is transmitted to computer sound generator 120 or input converter 132.

Figure 11:
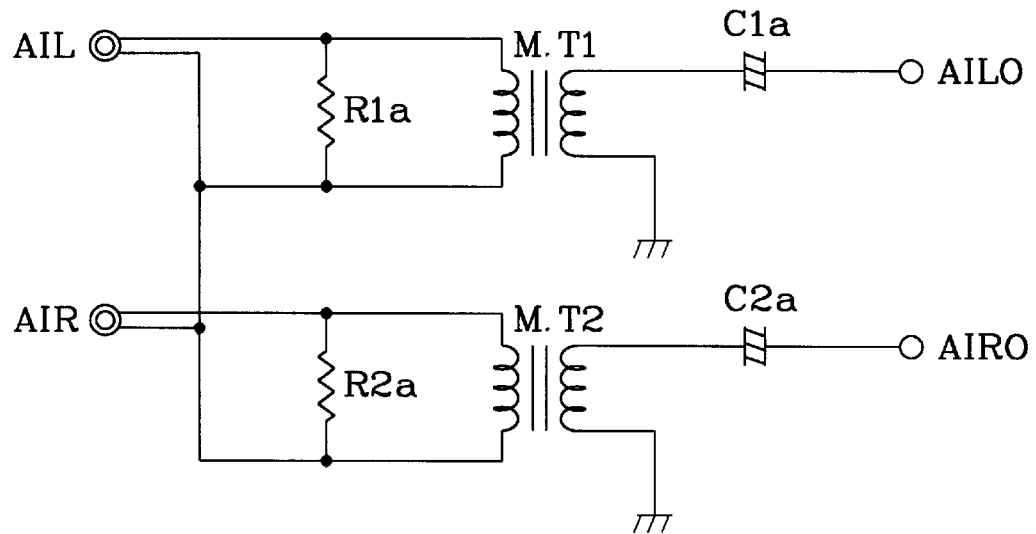
FIG. 11 is one preferred embodiment of the voice input circuit of FIG. 4.

An exemplary embodiment of voice input circuit 131 is illustrated in FIG. 11, wherein left voice signal output AIL of computer sound generator 120 is applied to the input and output terminals of the primary winding of matching transformer M.T1 across resistor R1a, and the input terminal of secondary winding of matching transformer M.T1 is connected to left voice signal AILO through capacitor C1a. Right voice signal AIR output from computer sound generator 120 is connected to the input and output terminals of primary winding of matching transformer MJ2 across resistor R2a, while the input terminal of secondary winding of matching transformer M.T2 is coupled to right voice signal AIRO terminal through capacitor C2a. Consequently, a pair of output signals AIL and AIR are applied to the input and output terminals of primary windings of matching transformer M.T1 and M.T2 across a pair of resistors R1a and R2a, respectively, and then induced to respective input and output terminals of secondary turns so as to output respective left and right voice signals AILO, AIRO through respective capacitors C1a and C2a.

Figure 12:
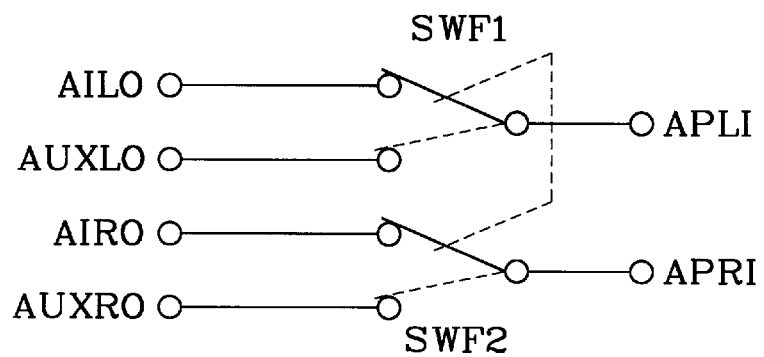
FIG. 12 is one preferred embodiment of the input converter of FIG. 4.

Also an exemplary embodiment of input converter 132 is illustrated in FIG. 12, wherein left voice signal AILO from voice input circuit 131 is connected to a fixed terminal of first switching stage SWF1 and the other fixed terminal thereof is connected to left output signal AUXO terminal of audio amplifier 141. The moving arm of first switching stage SWF1 is coupled to left voice signal APLI terminal. Right voice signal AIRO output from voice input circuit 131 is connected to a fixed terminal of second switching stage SWF2, while the other terminal thereof being is connected to right output signal AUXRO terminal of audio amplifier 141. The moving arm terminal of second switching stage SWF2 is connected to a terminal of right voice signal APRI. Here, first and second switching stages SWF1 and SWF2 are ganged switches. As a result, the circuitry of the above configuration enables a switching operation between a signal output from voice input circuit 131 or a signal output of audio amplifier 141 of switching controller 140.

Figure 13:
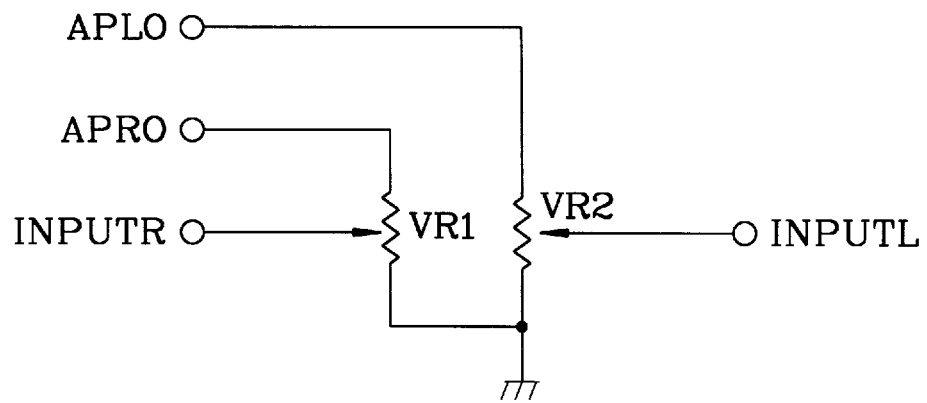
FIG. 13 is one preferred embodiment of the volume controller of FIG. 4.

An exemplary embodiment of volume controller 134 is illustrated in FIG. 13, wherein left voice output signal APLO generated from pre-amplifier 133 is coupled to a ground potential via variable resistor VR2 which outputs a varied left voice signal INPUTL at its output terminal connected to variable resistance arm. Right voice output signal APRO of pre-amplifier 133 is also grounded to a reference potential via a variable resistor VR1 which outputs a varied right voice signal INPUTR by an operation of variable resistance arm. Accordingly, an output voltage of pre-amplifier 133 is varied at its voltage level following the values of the variances of variable resistors VR1 and VR2, and thereby volume control is achieved.

Figure 14:
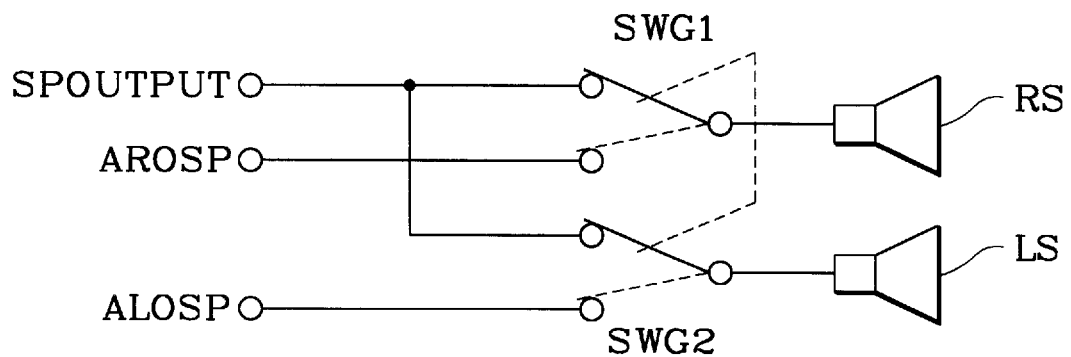
FIG. 14 is one preferred embodiment of the speaker controller of FIG. 4.

An exemplary embodiment of speaker controller 110 is illustrated in FIG. 14 wherein a signal output SPOUTPUT of speaker phone circuit 105 is commonly connected to fixed terminals of both first and second switching stages SWG1 and SWG2. Left voice signal AROSP output from main amplifier 135 is connected to the other fixed terminal of first switching stages SWG1 and right speaker is connected to the moving arm terminal thereof. Left voice signal ALOSP output from main amplifier 135 is connected to the other fixed terminal of second switching stage SWG2 and left speaker LS is coupled to the moving arm terminal thereof Here, a pair of first and second switching stages SWG1 and SWG2 are ganged switches. Accordingly, pursuant to an switching operation of first and second switching stages SWG1 and SWG2, input terminals of left and right loudspeakers LS and RS are enabled to switch to either an output of speaker phone circuit 105 or output signals AROSP, ALOSP.

In the process of generating a voice output signal from computer sound generator 120 as described above, according to the principle of the present invention, switching controller 140 enables a voice signal input from signal input stages 150 to be transmitted to any one of input terminal of computer sound generator 120 as an input C.M, or of audio amplifier 141 as an input A.M, or of speaker telephony circuit 104 as an input TELRXO.

In addition, an output TELRXO of telephony circuit 104 is able to be transmitted either to an input terminal of audio amplifier 141 in switching controller 140 or to an input terminal of computer sound generator 120 via switching controller 140 by a switch operation as explained above.

Furthermore, an output signal AUXRO, AUXLO generated from audio amplifier 141 of switching controller 140 may be switched between input converter 132 and computer sound generator 120. Speaker controller 110 may be switched between a pair of loudspeakers RS and LS and either the terminal of output signal SPOUTPUT of speaker phone 105 or the terminal of output signal AROSP, ALOSP of main amplifier 135.

Here, a plurality of switching means associated with switching controller 140, input converter 132 and speaker controller 110 may well be of any known configuration of a variety of switches, and be positioned to locations on any surface of a computer system.

It is well understood that an input by a key stroke on a keyboard may substitute for operation of any of the above switches.

The foregoing embodiments describe a coupling device for use with a computer system, and more particularly, a connecting circuit and device for a computer system having a telephone function. These embodiments contemplate incorporation of a telephone speech network so as to enable a user to freely engage in a telephone conversation when using a multi-media computer system, and also provide a set of internally mounted speakers in order to reduce the amount of space occupied by the multimedia computer system. As described above, according to the embodiment of the present invention, when a user working on a computer system is wanted on the phone, there is no need to stop the work or to surrender to an inconvenience of holding a telephone set by the shoulder and ear. In addition, the combination of circuits, such as computer sound generator, switching controller and telephone control circuit, enhances a working efficiency of a computer system having a variety of function as described above. Further, internally mounted speakers save the installation space of a computer system.

While there have been illustrated and described what are considered to be embodiments of the present invention, it will be understood by those skilled in the art that various changes and modifications may be make, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments failing within the scope of the appended claims.

What is claimed is:

1. A coupling device, for providing a telephone function for a computer system, said coupling device comprising:

mounting means integrally formed on a top surface of said coupling device for attaching to and detaching from a lower portion of a video display monitor;

a loudspeaker internally incorporated in said coupling device for generating audible sounds;

a control console panel for selectively switching between said telephone function and an audio function;

a plurality of input-output terminals provided for signal input to and signal output from a computer sound generator and a telephone speech network; and a sound control circuit for coupling signals output from said computer sound generator and said telephone speech network to said loudspeaker;

said sound control circuit comprising:

a telephone control circuit for controlling input signals applied to and output signals received from a telephone cord;

an amplifier circuit for amplifying a signal from one of said telephone control circuit and said computer sound generator, and for controlling a volume of an amplified signal generated at an output terminal of said amplifier circuit;

a speaker controller for selectively generating one of a signal output from said amplifier circuit and a signal output from said telephone control circuit for transmission to said loudspeaker;

a switching controller coupled to said telephone control circuit, said computer sound generator and said amplifier circuit for selectively switching said signal output from said telephone control circuit and said signal output from said computer sound generator for transmission to said amplifier circuit; and a signal input terminal for applying a signal input from said telephone control circuit said computer sound generator and an external microphone to said switching controller;

said telephone control circuit comprising:

a bridge circuit coupled to said telephone cord across a network comprising a varistor and a pair of induction coils;

a piezoelectric controller coupled to said pair of induction coils for driving and controlling a piezoelectric speaker;

a dial circuit coupled to an output terminal of said bridge circuit via a first switch;

a dial telephone circuit connected to said first switch for controlling a telephone set; and a speaker phone circuit coupled to said output terminal of said bridge circuit via a second switch.

2. The coupling device as set forth in claim 1, said amplifier circuit comprising:

a voice input circuit having an input terminal for receiving a voice signal output from said computer sound generator;

an input converter for converting signals received from said voice input circuit and said telephone control circuit into an electrical signal;

a pre-amplifier for amplifying said electrical signal provided by said input converter to produce a pre-amplified signal output;

a volume controller for controlling a volume of said pre-amplified signal output from said preamplifier means to produce a volume controlled signal output; and a main amplifier for amplifying said volume controlled signal output from said volume controller.

3. The coupling device as set forth in claim 2, wherein said speaker controller comprises a switch for selectively generating a signal output from one of said speaker phone circuit and said main amplifier for transmission to said loudspeaker.

4. The coupling device as set forth in claim 2, wherein said voice input circuit further comprises:

a first matching transformer having a primary winding and terminals of said primary winding connected in parallel with a first resistor and connected to left voice output terminals of said computer sound generator, and having a secondary winding and a terminal of said secondary winding connected to a left voice signal terminal of said input converter via a first capacitor; and a second matching transformer having a primary winding and terminals of said primary winding connected in parallel with a second resistor and connected to right voice output terminals of said computer sound generator, and having a secondary winding and a terminal of said secondary winding connected to a right voice signal terminal of said input converter via a second capacitor.

5. The coupling device as set forth in claim 2, wherein said input converter comprises a switch for selectively switching a signal output from one of said voice input circuit and an audio amplifier.

6. The coupling device as set forth in claim 2, wherein said volume controller comprises:

a first variable resistor having a first terminal connected to a right voice signal output from said pre-amplifier means, a second terminal connected to ground, and a variable arm generating a varied right voice signal at a first output terminal; and a second variable resistor having a first terminal connected to a left voice signal output from said pre-amplifier means, a second terminal connected to ground, and a variable arm generating a varied left voice signal at a second output terminal.

7. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

wherein said telephone circuitry comprises a dial circuit connected to said bridge circuit via said on/off-hook switch, and a dial telephone circuit connected between said on/off-hook switch and said speaker phone circuit, said dial telephone circuit being connected to said telephone set.

8. The coupling device as set forth in claim 7, wherein said control console panel means comprises a volume control switch, a microphone for said telephone function, and a display unit, said control console panel means being positioned at a substantially intermediate location between first and second units of said loudspeaker means.

9. The coupling device as set forth in claim 7, wherein said plurality of input-output terminals comprises a microphone input terminal, first and second voice input terminals, a power input terminal and telephone cord terminals, said power input terminal being connected to an output terminal of said video display monitor so as to form an electrical conduction path to energize circuits in said coupling device.

10. The coupling device as set forth in claim 7, wherein an upper portion of a front case of said coupling device, incorporating said control console panel and said loudspeakers, slopes at a slight grade.

11. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

said sound control circuit means further comprising:
  an amplifier circuit for amplifying a signal output from one of said telephone control circuit and said computer sound generator, and for controlling a volume of an amplified signal generated at an output terminal of said amplifier circuit;
  a speaker controller for selectively generating one of a signal output from said amplifier circuit and a signal output from said telephone control circuit for transmission to said loudspeaker means;
  a switching controller coupled to said telephone control circuit, said computer sound generator and said amplifier circuit for selectively switching said signal inputs from said telephone control circuit and from said computer sound generator for transmission to said amplifier circuit; and
  a signal input terminal for applying a signal input from said telephone control circuit, said computer sound generator and an external microphone to said switching controller;
  wherein said switching controller comprises an audio amplifier for amplifying said signal input from said signal input terminal to generate a left voice signal and a right voice signal at output terminals of said switching controller.

12. A coupling device for providing a telephone function for a computer system, said coupling device comprising:
  mounting means integrally formed on a top surface of said coupling device for attaching to and detaching from a lower portion of a video display monitor;
  loudspeaker means internally incorporated in said coupling device for generating audible sounds;
  control console panel means for selectively switching between said telephone function and an audio function;
  a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

said sound control circuit means further comprising: <an amplifier circuit for amplifying a signal output from one of said telephone control circuit and said computer sound generator, and for controlling a volume of an amplified signal generated at an output terminal of said amplifier circuit;
  a speaker controller for selectively generating one of a signal output from said amplifier circuit and a signal output from said telephone control circuit for transmission to said loudspeaker means;
  a switching controller coupled to said telephone control circuit, said computer sound generator and said amplifier circuit for selectively switching said signal inputs from said telephone control circuit and from said computer sound generator for transmission to said amplifier circuit; and
  a signal input terminal for applying a signal input from said telephone control circuit, said computer sound generator and an external microphone to said switching controller;
  wherein said switching controller comprises a switch for selectively transmitting said signal input from said signal input terminal to one of a speaker phone circuit, said computer sound generator and an audio amplifier.

13. A coupling device for providing a telephone function for a computer system, said coupling device comprising:
  mounting means integrally formed on a top surface of said coupling device for attaching to and detaching from a lower portion of a video display monitor;
  loudspeaker means internally incorporated in said coupling device for generating audible sounds;
  control console panel means for selectively switching between said telephone function and an audio function;
  a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

said sound control circuit means further comprising:
  an amplifier circuit for amplifying a signal output from one of said telephone control circuit and said computer sound generator, and for controlling a volume of an amplified signal generated at an output terminal of said amplifier circuit;
  a speaker controller for selectively generating one of a signal output from said amplifier circuit and a signal output from said telephone control circuit for transmission to said loudspeaker means;
a switching controller coupled to said telephone control circuit, said computer sound generator and said amplifier circuit for selectively switching said signal inputs from said telephone control circuit and from said computer sound generator for transmission to said amplifier circuit; and
a signal input terminal for applying a signal input from said telephone control circuit, said computer sound generator and an external microphone to said switching controller;
said switching controller comprising:
a first switch for selectively transmitting said signal input from said signal input terminal to one of a speaker phone circuit, said computer sound generator and an audio amplifier; and
a second switch for selectively transmitting a voice signal input from said telephone speech network to said audio amplifier.

14. A coupling device for providing a telephone function for a computer system, said coupling device comprising:
mounting means integrally formed on a top surface of said coupling device for attaching to and detaching from a lower portion of a video display monitor;
loudspeaker means internally incorporated in said coupling device for generating audible sounds;
control console panel means for selectively switching between said telephone function and an audio function;
a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;
wherein said sound control circuit means comprises a telephone control circuit for controlling input and output signals from and to a telephone cord; and
wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;
said sound control circuit means further comprising:
an amplifier circuit for amplifying a signal output from one of said telephone control circuit and said computer sound generator, and for controlling a volume of an amplified signal generated at an output terminal of said amplifier circuit;
a speaker controller for selectively generating one of a signal output from said amplifier circuit and a signal output from said telephone control circuit for transmission to said loudspeaker means;
a switching controller coupled to said telephone control circuit, said computer sound generator and said amplifier circuit for selectively switching said signal inputs from said telephone control circuit and from said computer sound generator for transmission to said amplifier circuit; and
a signal input terminal for applying a signal input from said telephone control circuit, said computer sound generator and an external microphone to said switching controller;
said switching controller comprising:
a first switch for selectively transmitting said signal input from said signal input terminal to one of an audio amplifier and said computer sound generator; and
a second switch for transmitting a signal output from a dial telephone circuit to said computer sound generator via a matching transformer after attenuating a voltage level thereof by a resistor.

15. A coupling device for providing a telephone function for a computer system, said coupling device comprising:
mounting means integrally formed on a top surface of said coupling device for attaching to and detaching from a lower portion of a video display monitor;
loudspeaker means internally incorporated in said coupling device for generating audible sounds;
control console panel means for selectively switching between said telephone function and an audio function;
a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;
wherein said sound control circuit means comprises a telephone control circuit for controlling input and output signals from and to a telephone cord; and
wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;
said sound control circuit means further comprising:
an amplifier circuit for amplifying a signal output from one of said telephone control circuit and said computer sound generator, and for controlling a volume of an amplified signal generated at an output terminal of said amplifier circuit;
a speaker controller for selectively generating one of a signal output from said amplifier circuit and a signal output from said telephone control circuit for transmission to said loudspeaker means;
a switching controller coupled to said telephone control circuit, said computer sound generator and said amplifier circuit for selectively switching said signal inputs from said telephone control circuit and from said computer sound generator for transmission to said amplifier circuit; and
a signal input terminal for applying a signal input from said telephone control circuit, said computer sound generator and an external microphone to said switching controller;
said switching controller comprising:
a first switch for selectively transmitting a signal input via said signal input terminal to one of a speaker phone circuit, an audio amplifier and said computer sound generator;
a second switch for selectively transmitting a signal input via said signal input terminal to a dial telephone circuit;

a third switch for selectively transmitting a signal output from said dial telephone circuit to said computer sound generator via a matching transformer; and a fourth switch for selectively applying input-output signals of said dial telephone circuit to one of said computer sound generator and said signal input terminal.

16. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

said sound control circuit means further comprising:

an amplifier circuit for amplifying a signal output from one of said telephone control circuit and said computer sound generator, and for controlling a volume of an amplified signal generated at an output terminal of said amplifier circuit;

a speaker controller for selectively generating one of a signal output from said amplifier circuit and a signal output from said telephone control circuit for transmission to said loudspeaker means;

a switching controller coupled to said telephone control circuit, said computer sound generator and said amplifier circuit for selectively switching said signal inputs from said telephone control circuit and from said computer sound generator for transmission to said amplifier circuit; and a signal input terminal for applying a signal input from said telephone control circuit, said computer sound generator and an external microphone to said switching controller;

wherein said switching controller comprises a switch for selectively switching a signal output from an audio amplifier to one of said computer sound generator and an input converter.

17. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

wherein said sound control circuit means further comprises an amplifier circuit for amplifying a signal output from one of said telephone control circuit and said computer sound generator, and for controlling a volume of an amplified signal generated at an output terminal of said amplifier circuit;

said sound control circuit means further comprising a switching controller coupled to said telephone control circuit, said computer sound generator and said amplifier circuit for selectively switching said signal inputs from said telephone control circuit and from said computer sound generator for transmission to said amplifier circuit;

wherein said switching controller comprises an audio amplifier for amplifying said signal input from said signal input terminal to generate a left voice signal and a right voice signal at output terminals of said switching controller.

18. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

wherein said sound control circuit means further comprises an amplifier circuit for amplifying a signal output from one of said telephone control circuit and said computer sound generator, and for controlling a volume of an amplified signal generated at an output terminal of said amplifier circuit;

said sound control circuit means further comprising a switching controller coupled to said telephone control circuit, said computer sound generator and said amplifier circuit for selectively switching said signal inputs from said telephone control circuit and from said computer sound generator for transmission to said amplifier circuit;

wherein said switching controller comprises a switch for selectively transmitting said signal input from said signal input terminal to one of a speaker phone circuit, said computer sound generator and an audio amplifier.

19. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

wherein said sound control circuit means further comprises an amplifier circuit for amplifying a signal output from one of said telephone control circuit and said computer sound generator, and for controlling a volume of an amplified signal generated at an output terminal of said amplifier circuit;

said sound control circuit means further comprising a switching controller coupled to said telephone control circuit, said computer sound generator and said amplifier circuit for selectively switching said signal inputs from said telephone control circuit and from said computer sound generator for transmission to said amplifier circuit;

said switching controller comprising:
a first switch for selectively transmitting said signal input from said signal input terminal to one of a speaker phone circuit, said computer sound generator and an audio amplifier; and
a second switch for selectively transmitting a voice signal input from said telephone speech network to said audio amplifier.

20. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

wherein said sound control circuit means further comprises an amplifier circuit for amplifying a signal output from one of said telephone control circuit and said computer sound generator, and for controlling a volume of an amplified signal generated at an output terminal of said amplifier circuit;

said sound control circuit means further comprising a switching controller coupled to said telephone control circuit, said computer sound generator and said amplifier circuit for selectively switching said signal inputs from said telephone control circuit and from said computer sound generator for transmission to said amplifier circuit;

said switching controller comprising:
a first switch for selectively transmitting said signal input from said signal input terminal to one of an audio amplifier and said computer sound generator; and
a second switch for transmitting a signal output from a dial telephone circuit to said computer sound generator via a matching transformer after attenuating a voltage level thereof by a resistor.

21. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said sound control circuit means further comprises an amplifier circuit for amplifying a signal output from one of said telephone control circuit and said computer sound generator, and for controlling a volume of an amplified signal generated at an output terminal of said amplifier circuit;

said sound control circuit means further comprising a switching controller coupled to said telephone control circuit, said computer sound generator and said amplifier circuit for selectively switching signal inputs from said telephone control circuit and from said computer sound generator for transmission to said amplifier circuit;

said switching controller comprising:
  a first switch for selectively transmitting a signal input via a signal input terminal to one of a speaker phone circuit, an audio amplifier and said computer sound generator;
  a second switch for selectively transmitting a signal input via said signal input terminal to a dial telephone circuit;
  a third switch for selectively transmitting a signal output from said dial telephone circuit to said computer sound generator via a matching transformer; and
  a fourth switch for selectively applying input-output signals of said dial telephone circuit to one of said computer sound generator and said signal input terminal.

22. A coupling device for providing a telephone function for a computer system, said coupling device comprising:

mounting means integrally formed on a top surface of said coupling device for attaching to and detaching from a lower portion of a video display monitor;

loudspeaker means internally incorporated in said coupling device for generating audible sounds;

control console panel means for selectively switching between said telephone function and an audio function;

a plurality of input-output terminals for receiving signal inputs from and for sending signal outputs to a computer sound generator and a telephone speech network; and sound control circuit means for coupling signal inputs received from said computer sound generator and said telephone speech network to said loudspeaker means;

wherein said sound control circuit means comprises a telephone control circuit for controlling input and output signals from and to a telephone cord; and wherein said telephone control circuit comprises a bridge circuit coupled to said telephone cord for receiving said input signals therefrom and for sending said output signals thereto, a piezoelectric controller connected between said telephone cord and a piezoelectric system for driving said piezoelectric system, telephone circuitry connected to said bridge circuit via an on/off-hook switch for controlling a telephone set connected to said telephone circuitry, and a speaker phone circuit connected to said bridge circuit via an on/off switch;

wherein said sound control circuit means further comprises an amplifier circuit for amplifying a signal output from one of said telephone control circuit and said computer sound generator, and for controlling a volume of an amplified signal generated at an output terminal of said amplifier circuit;

said sound control circuit means further comprising a switching controller coupled to said telephone control circuit, said computer sound generator and said amplifier circuit for selectively switching said signal inputs from said telephone control circuit and from said computer sound generator for transmission to said amplifier circuit;

wherein said switching controller comprises a switch for selectively switching a signal output from an audio amplifier to one of said computer sound generator and an input converter.

* * * * *